United States Patent
Liao et al.

(10) Patent No.: US 6,772,983 B1
(45) Date of Patent: Aug. 10, 2004

(54) PIVOT COUPLER FOR PIVOTALLY CONNECTING A MONITOR TO A STAND

(75) Inventors: Chi-Cheng Liao, Banchiau (TW); Tsyr-Huey Liu, Banchiau (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/642,604

(22) Filed: Aug. 19, 2003

(30) Foreign Application Priority Data

May 16, 2003 (TW) ...................................... 92208974 U

(51) Int. Cl.⁷ .............................................. E05D 11/08
(52) U.S. Cl. .................... 248/291.1; 248/923; 248/397; 361/681; 16/340; 16/342; 16/374
(58) Field of Search ............................. 248/291.1, 371, 248/397, 922, 923; 16/319, 337, 340, 341, 342, 374; 361/681

(56) References Cited

U.S. PATENT DOCUMENTS

| | | | | |
|---|---|---|---|---|
| 5,335,142 A | * | 8/1994 | Anderson | 361/681 |
| 5,652,694 A | * | 7/1997 | Martin | 361/681 |
| 5,765,794 A | * | 6/1998 | Chen | 248/292.12 |
| 6,378,830 B1 | * | 4/2002 | Lu | 248/278.1 |
| 6,532,628 B2 | * | 3/2003 | Kim | 16/342 |
| 6,644,611 B1 | * | 11/2003 | Tai | 248/292.13 |

* cited by examiner

*Primary Examiner*—Leslie A. Braun
*Assistant Examiner*—Jon Szumny
(74) *Attorney, Agent, or Firm*—Bacon & Thomas PLLC

(57) ABSTRACT

A pivot coupler is constructed to include a hinge base fastened to a stand and holding two packing piece sets at two sides, a hinge bracket fastened to a monitor and holding two washers at two sides, and a shaft inserted in the hinge base and the hinge bracket and locked by a nut to pivotally secure the hinge bracket to the hinge base and to hold the packing piece sets of the hinge base in friction contact with the washers of the hinge bracket.

7 Claims, 3 Drawing Sheets

PIVOT COUPLER FOR PIVOTALLY CONNECTING A MONITOR TO A STAND

BACKGROUND OF THE INVENTION

1. Field of the Invention

The present invention relates to a pivot structure and, more particularly, to a pivot coupler for use to pivotally connect a monitor, for example, a flat-panel display to a stand, enabling the display to be turned steplessly to the desired angle of inclination.

2. Description of Related Art

Following fast development of high technology, space-saving flat-panel displays have been intensively used to substitute for heavy and bulky CRT monitors. For example, standard desktop computer system uses a LCD display instead of a conventional CRT monitor.

A flat-panel display generally uses a pivot coupler to pivotally connect the display panel to the stand so that the user can adjust the display panel to the desired angle of inclination. A pivot coupler for this purpose is generally comprised of a hinge base, and a hinge bracket pivoted to the hinge base. The display panel is fastened to the hinge bracket, and turned with the hinge bracket relative to the hinge base to the desired angle of inclination.

According to the aforesaid conventional pivot coupler, plastic friction members are provided between the hinge base and the hinge bracket to produce a friction resistance that holds the hinge bracket in the adjusted position. The plastic friction members are specially designed and formed of special plastics. The use of special plastics greatly increases the manufacturing cost of the pivot coupler. However, the plastic friction members wear quickly with use, and cannot dissipate heat during friction. Further, the aforesaid conventional design uses two tightening up plastic covers to tighten the connection between the hinge base and the hinge bracket. When the friction contact between the plastic friction members loosened, the tightening up plastic covers must be fastened tight further. Because the tightening up plastic covers bear much pressure in axial direction, they tend to break when receiving a high pressure.

Therefore, it is desirable to have a pivot coupler for monitor that eliminates the aforesaid problems.

SUMMARY OF THE INVENTION

It is the main object of the present invention to provide a pivot coupler for pivotally connecting a monitor to a stand, which is durable in use and inexpensive to manufacture.

It is another object of the present invention to provide a pivot coupler for pivotally connecting a monitor to a stand, which dissipates heat quickly during friction action of its movable parts.

It is still another object of the present invention to provide a pivot coupler for pivotally connecting a monitor to a stand, which has a simple structure that enables the hinge bracket to be directly turned tightly relative to the hinge base.

To achieve these and other objects of the present invention, the pivot coupler is coupled between a monitor and a stand, comprising: a hinge base, the hinge base having a bottom wall fastened to the stand, and a cylindrical support horizontally extended on a top side of the bottom wall, the cylindrical support having a curved peripheral surface, a left side, a right side, a left locating recess formed in the center of the left side, a left packing piece set mounted in the left locating recess, a right locating recess formed in the center of the right side, a right packing piece set mounted in the right locating recess, and a central axle hole extended through the left locating recess and the right locating recess; a substantially U-shaped hinge bracket, the hinge bracket comprising at least one mounting members, a left side plate, a right side plate, and a top plate, the at least one mounting member affixed to a back side of the monitor, the left side plate and the right side plate respectively suspended at two sides and each having an inner face and an outer face, the top plate connected between the left side plate and the right side plate at a top side, a left through hole cut through the inner face and outer face of the left side plate, a right through hole cut through the inner face and outer face of the right side plate, a left washer mounted in the inner face of the left side plate, and a right washer mounted in the inner face of the right side plate, the top plate having a bottom face; and a shaft inserted through the central axle hole of the hinge base, the left and right through holes of the hinge bracket, the left and right packing piece sets of the hinge base, and the left and right washers of the hinge bracket, the shaft having a stop block formed in one end thereof and stopped outside the outer face of the left side plate of the hinge bracket and a screw rod axially formed in an opposite end thereof and extended from out of the outer face of the right side plate of the hinge bracket and screwed up with a nut, keeping the left and right packing piece sets of the hinge base respectively disposed in contact with the left and right washers of the hinge bracket.

The friction contact design between the left and right packing piece sets of the hinge base and the left and right washers of the hinge bracket enables the monitor to be steplessly turned to the designed angle of inclination. Because the friction area is between the left and right packing piece sets of the hinge base and the left and right washers of the hinge bracket without causing direction contact between the hinge base and the hinge bracket, it is not necessary to make the hinge base and the hinge bracket with a special material. Therefore, the manufacturing cost of the pivot coupler is greatly reduced. Further, because of low friction between the left and right packing piece sets and the left and right washers, the service life of the prevent invention is prolonged. Due to high heat conductivity, the left and right packing piece sets and the left and right washers dissipate heat efficiently during friction therebetween.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
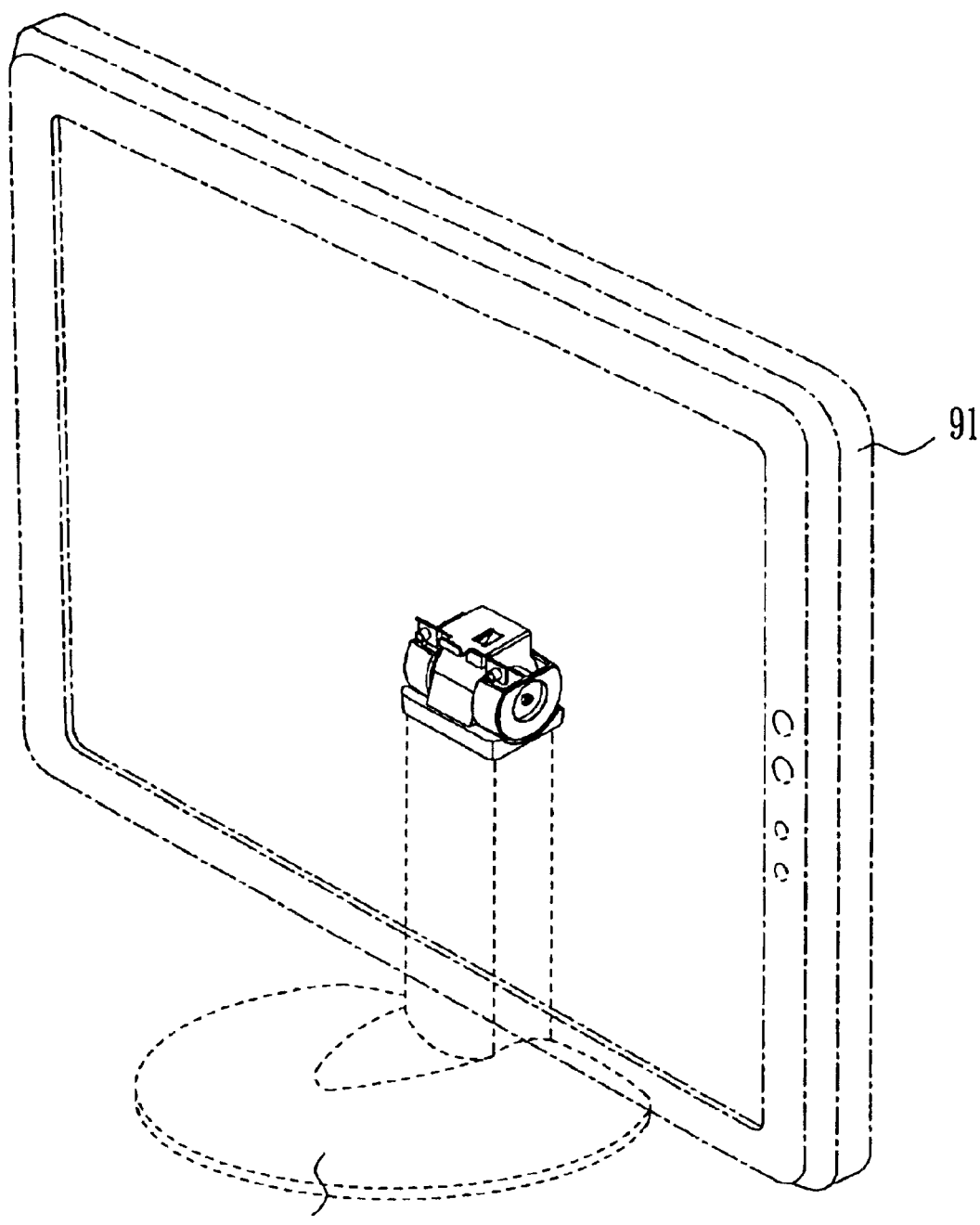
FIG. 1 illustrates a pivot coupler coupled between a monitor and a stand according to the present invention.

Referring to FIG. 1, a pivot coupler is shown installed in between a monitor 91 and a stand 92.

Figure 2:
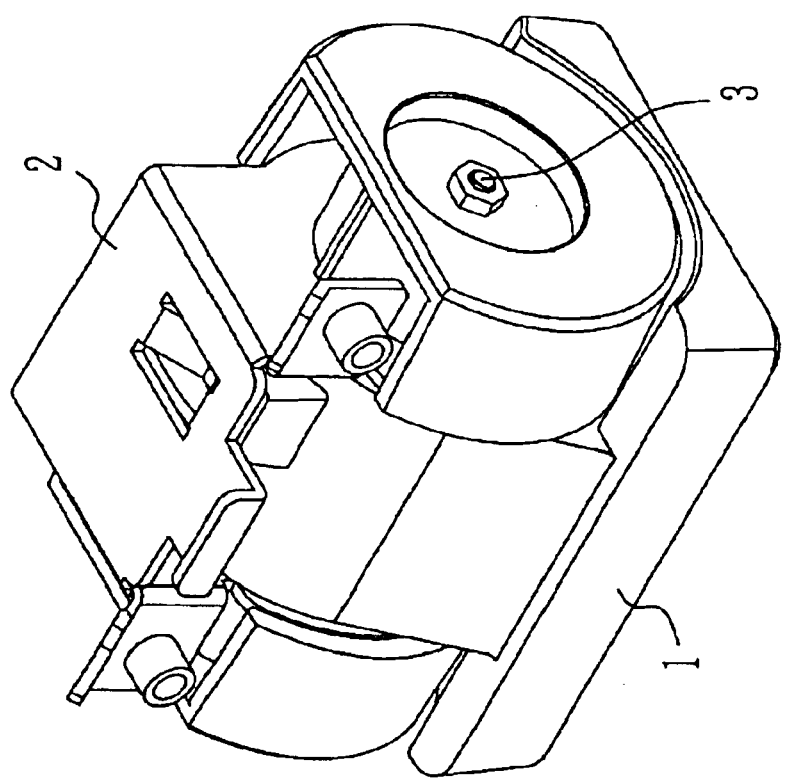
FIG. 2 is an elevational view of a pivot coupler according to the present invention.
Figure 3:
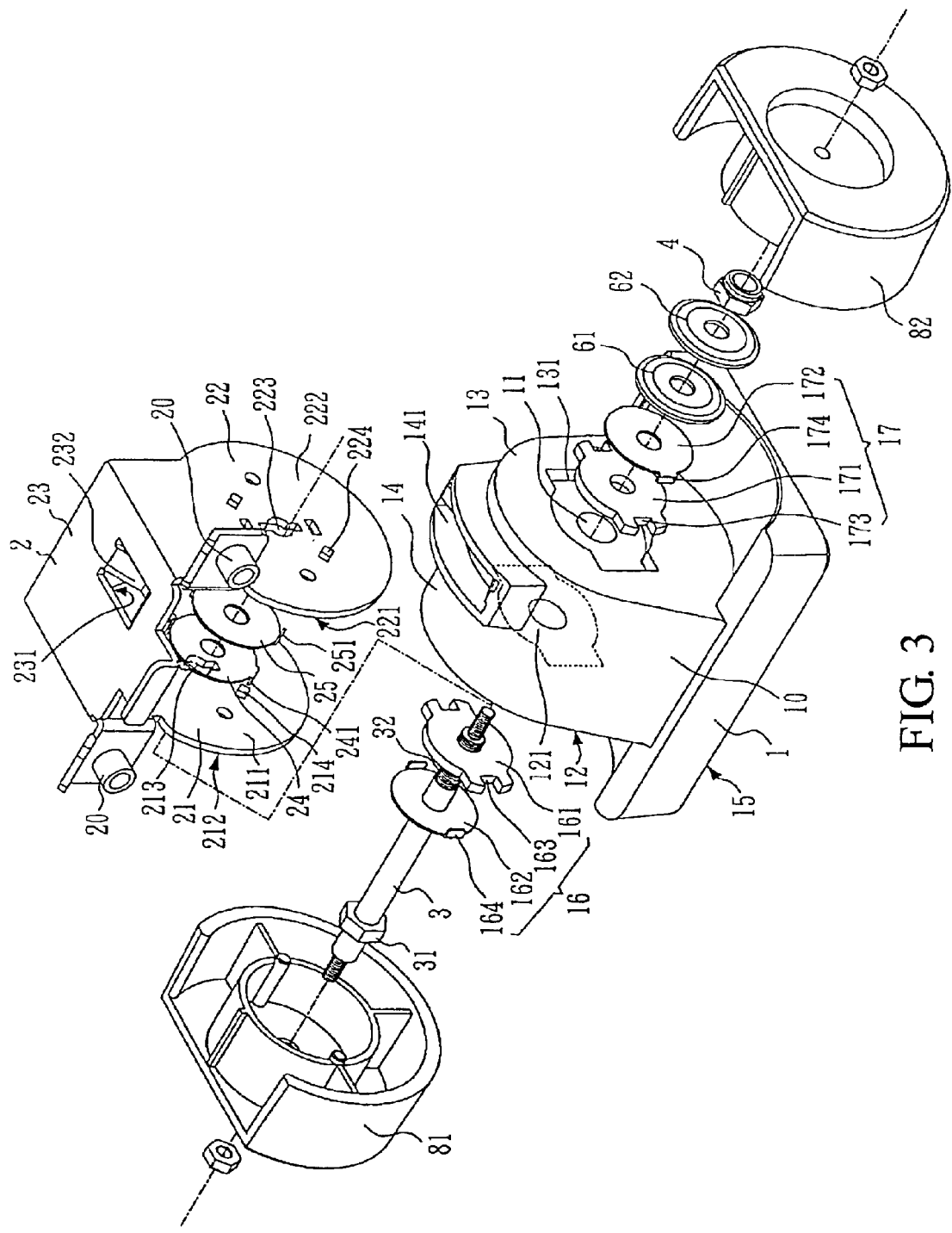
FIG. 3 is an exploded view of the pivot coupler shown in FIG. 2.

Referring to FIGS. 2 and 3, and FIG. 1 again, the pivot coupler is comprised of a hinge base 1, a hinge bracket 2, and a shaft 3. The hinge base 1 has a bottom wall 15 fastened to the stand 92, and a cylindrical support 10 horizontally extended on the top side of the bottom wall 15. The cylindrical support 10 has a curved peripheral surface 14, a left side 12, a right side 13, a left locating recess 121 formed in the center of the left side 12 and adapted to accommodate a left packing piece set 16, a right locating recess 131 formed in the center of the right side 13 and adapted to accommodate a right packing piece set 17, and a central axle hole 11 extended through the left locating recess 121 and the right locating recess 131. The left packing piece set 16 is comprised of a locating plate 161 and a packing piece 162. The right packing piece set 17 is comprised of a locating plate 171 and a packing piece 172. The locating plate 161 or 171 has a plurality of locating notches 163 or 173. The packing piece 162 or 172 has a plurality of retaining projections 164 or 174 corresponding to the locating notches 163 or 173. The locating plates 161 and 171 are respectively set in the left locating recess 121 and the right locating recess 131 at first, and then the packing pieces 162 and 172 are respectively mounted on the locating plates 161 and 171 to force the respective retaining projections 164 and 174 into engagement with the respective locating notches 163 and 173.

The hinge bracket 2 is a substantially U-shaped frame comprising two mounting members 20 respectively fastened to the back side of the monitor 91 by, for example, screws. The hinge bracket 2 further comprises a left side plate 21 and a right side plate 22 respectively suspended at two sides, the left side plate 21 and the right side plate 22 each having an inner face 211 or 221 and an outer face 212 or 222, a top plate 23 connected between the left side plate 21 and the right side plate 22 at the top, the top plate 23 having a bottom face 231, a left through hole 213 cut through the inner face 211 and outer face 212 of the left side plate 21, a right through hole 223 cut through the inner face 221 and outer face 222 of the right side plate 22, a plurality of retaining holes 214 and 224 respectively formed in the inner faces 211 and 221 of the left and right side plates 21 and 22, and two washers, namely, the left washer 24 and the right washer 25 respectively mounted in the inner faces 211 and 221 of the left and right side plates 21 and 22, the washers 24 and 25 each having a plurality of retaining projections 241 or 251 respectively engaged into the retaining holes 214 and 224.

The shaft 3 is inserted through the central axle hole 11 and the left and right through holes 213 and 223 of the hinge bracket 2, having a stop lock 31 formed in one end thereof and stopped outside the outer face 212 of the left side plate 21 of the hinge bracket 2 and a screw rod 32 axially formed in the other end thereof and extended out of the outer face 222 of the right side plate 22 of the hinge bracket 2 and screwed up with a nut 4, keeping the left and right packing piece sets 16, and 17 respectively closely disposed in contact with the left and right washers 24 and 25.

The aforesaid packing pieces 162 and 172 and washers 24 and 25 according to the present preferred embodiment are respectively made of medium carbon steel, and the left and right locating plates 161 and 171 are respectively made of galvanized steel. This design saves much of the cost.

Therefore, by means of the hinge bracket 2 and the shaft 3, the monitor 91 can be turned relative to the hinge base 1 and the stand 92 to the desired angle of inclination steplessly. Further, a limit slot 141 is formed in the curved peripheral surface 14 of the hinge base 1, and a protruded stop member 232 is formed in the bottom face 231 of the top plate 23 of the hinge bracket 2 and movably inserted Into the limit slot 141 of the hinge base 1 to limit the turning angle of the monitor 91. When turning the monitor 91 with the hinge bracket 2 relative to the hinge base 1, the left and right packing piece sets 16 and 17 are respectively rubbed over the left and right washers 24 and 25, producing a contact friction, i.e., the friction area is between the left and right packing piece sets 16 and 17 and the left and right washers 24 and 25 without causing direction contact between the hinge base 1 and the hinge bracket 2. Therefore, the manufacturing cost of the hinge base 1 and the hinge bracket 2 can greatly be reduced because it is not necessary to make the hinge base 1 and the hinge bracket 2 with a special material. Further, because of low friction between the left and right packing piece sets 16 and 17 and the left and right washers 24 and 25, the service life of the prevent invention is prolonged. Due to high heat conductivity, the left and right packing piece sets 16 and 17 and the left and right washers 24 and 25 dissipate heat efficiently during friction therebetween.

Further, a left shaft cover 81 and a right shaft cover 82 are respectively axially covered on the left side 12 and right side 13 of the cylindrical support 10 of the hinge base 1. Because the hinge base 1 and the hinge bracket 2 be tightened directly by the nut 4 on the shaft 3 but not by the shaft covers 81 and 82, fastening up the hinge base 1 and the hinge bracket 2 does not cause the shaft covers 81 and 82 to break, i.e., the shaft covers 81 and 82 are used as ornamental members but not fastening members.

There are also provided two spring washers 61 and 62 mounted on the shaft 3 and stopped between the nut 4 and the outer face 222 of the right side plate 22 of the hinge bracket 2. The spring washers 61 and 62 impart an axially extended spring force to force the left and right packing piece sets 16 and 17 into close contact with the left and right washers 24 and 25, i.e., the axially extended spring force of the spring washers 61 and 62 produces a torsion compensation effect, holding the left and right packing piece sets 16 and 17 in close contact with the left and right washers 24 and 25. One single spring washer may be used instead of the aforesaid two spring washers 61 and 62.

A prototype of pivot coupler for monitor has been constructed with the features of FIGS. 1~3. The pivot coupler for monitor functions smoothly to provide all of the features discussed earlier.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A pivot coupler coupled between a monitor and a stand, comprising:

a hinge base, said hinge base having a bottom wall fastened to said stand, and a cylindrical support horizontally extended on a top side of said bottom wall, said cylindrical support having a curved peripheral surface, a left side, a right side, a left locating recess formed in the center of said left side, a left packing piece set mounted in said left locating recess, a right locating recess formed in the center of said right side, a right packing piece set mounted in said right locating recess, and a central axle hole extended through said left locating recess and said right locating recess;

a substantially U-shaped hinge bracket, said hinge bracket comprising at least one mounting member, a left side plate, a right side plate, and a top plate, said at least one mounting member affixed to a back side of said monitor, said left side plate and said right side plate respectively suspended at two sides of said top plate and each having an inner face and an outer face, said top plate connected between said left side plate and said right side plate at a top side, a left through hole cut through the inner face and outer face of said left side plate, a right through hole cut through the inner face and outer face of said right side plate, a left washer mounted in the inner face of said left side plate, and a right washer mounted in the inner face of said right side plate, said top plate having a bottom face; and a shaft inserted through the central axle hole of said hinge base, the left and right through holes of said hinge bracket, the left and right packing piece sets of said hinge base, and the left and right washers of said hinge bracket, said shaft having a stop block formed in one end thereof and stopped outside the outer face of said left side plate of said hinge bracket and a screw rod axially formed in an opposite end thereof and extended from out of the outer face of said right side plate of said hinge bracket and screwed up with a nut, keeping the left and right packing piece sets of said hinge base respectively disposed in contact with the left and right washers of said hinge bracket.

2. The pivot coupler as claimed in claim 1, further comprising at least one spring washer mounted on said shaft and adapted to impart an axially extended spring force to hold the left and right packing piece sets of said hinge base respectively in contact with the left and right washers of said hinge bracket.

3. The pivot coupler as claimed in claim 1 wherein said hinge base has a limit slot formed in said curved peripheral surface; said hinge bracket has a protruded stop member formed in the bottom face of said top plate and movably inserted into the limit slot of said hinge base.

4. The pivot coupler as claimed in claim 1, wherein said left packing piece set of said hinge base comprises a locating plate mounted in the left locating recess of the left side plate of said hinge base, and a packing piece fastened to the locating plate of said left packing piece set; said right packing piece set of said hinge base comprises a locating plate mounted in the right locating recess of the right side plate of said hinge base, and a packing piece fastened to the locating plate of said right packing piece set.

5. The pivot coupler as claimed in claim 4, wherein the locating plates of said left packing piece set and said right packing piece set each have at least one locating notch, and the packing pieces of said left packing piece set and said right packing piece set each have at least one retaining projection respectively fastened to the at least one locating notch of the locating plates of said left packing piece set and said right packing piece set.

6. The pivot coupler as claimed in claim 1, wherein the inner faces of the left side plate and the right side plate of said hinge bracket each have at least one retaining hole, and the left washer and right washer of said hinge bracket each have at least one retaining projection respectively engaged into the retaining holes in the inner faces of said left side plate and said right side plate.

7. The pivot coupler as claimed in claim 1, further comprising a left shaft cover and a right shaft cover respectively axially covered on the left side and right side of said cylindrical support of said hinge base.

* * * * *